(12) United States Patent
Weiss et al.

(10) Patent No.: US 9,092,030 B2
(45) Date of Patent: Jul. 28, 2015

(54) METHOD TO IMPLEMENT DRIVE DIAGNOSTICS AND PROGNOSTICS AUTOMATICALLY

(71) Applicant: ROCKWELL AUTOMATION TECHNOLOGIES, INC., Mayfield Heights, OH (US)

(72) Inventors: Bruce William Weiss, Milwaukee, WI (US); Robert Michael Michalski, West Bend, WI (US); Lixiang Wei, Whitefish Bay, WI (US); Garron Koch Morris, Whitefish Bay, WI (US); Brian Patrick Brown, Mayville, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 181 days.

(21) Appl. No.: 13/803,472

(22) Filed: Mar. 14, 2013

(65) Prior Publication Data

US 2014/0265976 A1  Sep. 18, 2014

(51) Int. Cl.
*G05B 5/00* (2006.01)
*G05B 23/02* (2006.01)
*G05D 23/19* (2006.01)
*G05B 11/01* (2006.01)
*H02P 31/00* (2006.01)

(52) U.S. Cl.
CPC ............ *G05B 23/0224* (2013.01); *G05B 11/01* (2013.01); *G05D 23/1917* (2013.01); *H02P 31/00* (2013.01)

(58) Field of Classification Search
CPC ... H05K 7/20209; G06F 1/206; G01R 31/343
USPC .................................... 318/471, 490; 702/183
See application file for complete search history.

(56) References Cited

U.S. PATENT DOCUMENTS

| | | | |
|---|---|---|---|
| 7,308,322 B1 | 12/2007 | Discenzo | |
| 7,826,985 B2 | 11/2010 | Weiss et al. | |
| 8,148,929 B2 | 4/2012 | Wei et al. | |
| 8,188,693 B2 | 5/2012 | Wei et al. | |
| 2007/0017667 A1* | 1/2007 | Weng | 165/214 |
| 2009/0056359 A1* | 3/2009 | Germagian | 62/259.2 |
| 2009/0123284 A1* | 5/2009 | Madsen | 416/36 |
| 2009/0167228 A1 | 7/2009 | Chung et al. | |
| 2010/0095909 A1 | 4/2010 | Lin et al. | |
| 2011/0286244 A1 | 11/2011 | Wei et al. | |

OTHER PUBLICATIONS

Extended European Search Report Mailed Feb. 23, 2015.
(Continued)

*Primary Examiner* — Karen Masih
(74) *Attorney, Agent, or Firm* — Fletcher Yoder P.C.

(57) ABSTRACT

An electric motor drive system includes a fan configured to cool power electronic components of the electric motor drive system. The electric motor drive system also includes a temperature sensor disposed proximate an air inlet of the fan and configured to sense an ambient temperature of air entering the air inlet. In addition, the electric motor drive system includes a processor communicatively coupled to the temperature sensor and configured to determine at least one of a drive prognostic and a derating requirement based on the sensed ambient temperature.

23 Claims, 11 Drawing Sheets

(56) References Cited

OTHER PUBLICATIONS

Xiang Y et al: "A Prognostic and Warning System for Power Electronic Modules in Electric, Hybrid, and Fuel Cell Vehicles", The 2006 IEEE Industry Applications Conference Forty-First IAS Annual Meeting, Conference Record of, IEEE, Piscataway, NJ, US, Oct. 1, 2006.

Pecht M et al: "A Prognostics and Health Management Roadmap for Information and Electronics-Rich Systems", Microelectronics and Reliability, Elsevier Science Ltd., GB, vol. 50, No. 3, Mar. 1, 2010.

* cited by examiner

METHOD TO IMPLEMENT DRIVE DIAGNOSTICS AND PROGNOSTICS AUTOMATICALLY

BACKGROUND

The present invention relates generally to the field of power electronic devices, and particularly to implementing diagnostics and prognostics for electric motor drives based on a measured drive inlet temperature.

A myriad of applications exist in industry for motor drives of various types. In many applications, a motor drive includes a circuit for driving an electromagnetic machine, such as a brushed or brushless motor, stepper motor, or other electromechanical actuator. Such motors and actuators may be internal to or external from their respective motor drives. Multiple motor drives may be positioned across various parts of a factory or manufacturing site. In the case of higher power applications, multi-phase motors are commonly used with separate motor drives that may be positioned in cabinets in the general vicinity of the driven motor.

Motor drives generally are designed to output only a certain percentage of a maximum power rating for the device. When new, and during most of the useful life of the machines, the power rating may remain as initially assigned, although some derating may be in order due to environmental conditions, machine age, and other factors. That is, the motor drive is derated from a maximum current output to meet a derating requirement specific to the motor drive, effectively lowering the output of the drive and motor. This derating requirement may be different when the motor drive is operated at different ambient temperatures, which may adversely impact both the performance of the machines, as well as shorten their useful life. In addition, a number of prognostics may be determined for the motor drive based on the ambient temperature at which the motor drive operates.

To perform calculations of various diagnostics, prognostics, and so forth, motor drives often include temperature sensors located on a circuit board of the motor drive. Such temperature sensors are usually buried inside the motor drive itself, enclosed by a protective housing and surrounded by elements that may affect the temperature measurement. In some motor drives, a processor estimates the ambient temperature measurement from the internal operating temperature of the motor drive by applying an energy balance equation. This estimate may be very accurate upon initial operation of the motor drive. Unfortunately, over time this estimate may become less accurate because of operational inefficiencies and degradation of internal cooling mechanisms of the motor drive. Accordingly, it is now recognized that it is desirable to have a motor drive with improved ambient temperature sensing, in order to provide more accurate motor drive diagnostic and prognostic information to a user.

BRIEF DESCRIPTION

In a first embodiment, an electric motor drive system includes a fan configured to cool power electronic components of the electric motor drive system. The electric motor drive system also includes a temperature sensor disposed proximate an air inlet of the fan and configured to sense an ambient temperature of air entering the air inlet. In addition, the electric motor drive system includes a processor communicatively coupled to the temperature sensor and configured to determine at least one of a drive prognostic and a drive diagnostic based on the sensed ambient temperature.

In another embodiment, an electric motor drive system includes a first fan configured to cool power electronic components of a first motor drive and a second fan configured to cool power electronic components of a second motor drive. The electric motor drive system also includes a first temperature sensor disposed proximate a first air inlet of the first fan and configured to sense a first ambient temperature of air entering the first air inlet. In addition, the electric motor drive system includes a second temperature sensor disposed proximate a second air inlet of the second fan and configured to sense a second ambient temperature of air entering the second air inlet. Still further, the electric motor drive system includes a processor communicatively coupled to the first and second temperature sensors and configured to determine at least one of a drive prognostic and a drive diagnostic for each of the first and second motor drives based on the first and second sensed ambient temperatures.

In a further embodiment, a method includes sensing an ambient air temperature via a temperature sensor disposed proximate an air inlet of a fan of an electric motor drive. The fan is configured to cool power electronic components of the electric motor drive via air drawn through the air inlet. The method also includes determining, via a processor communicatively coupled to the temperature sensor, at least one of a drive prognostic and a drive diagnostic based on the sensed ambient temperature.

DRAWINGS

These and other features, aspects, and advantages of the presently disclosed embodiments will become better understood when the following detailed description is read with reference to the accompanying drawings in which like characters represent like parts throughout the drawings, wherein.

DETAILED DESCRIPTION

Presently disclosed embodiments are directed to systems and methods for determining prognostics and diagnostics for electric motor drive systems. Specifically, the systems and methods described herein use an ambient air temperature measurement to determine the drive prognostics and diagnostics. The ambient air temperature may be measured directly using a temperature sensor positioned near an air inlet of the motor drive. This inlet air temperature measurement may be more accurate than an ambient temperature estimate that is calculated from an internal temperature of the power module of the motor drive. Thus, the systems and methods disclosed herein may provide more accurate prognostics and diagnostics for the motor drive during operation of the motor drive. By implementing certain actions based on the determined prognostics and diagnostics, the motor drive systems may receive improved preventive maintenance and drive control, which may ultimately lead to more efficient drive operation and extended life of the motor drive. The techniques discussed below may be applied to any desirable electric motor drive system, including a system with multiple motor drives operating in parallel to drive a single process.

Figure 1:
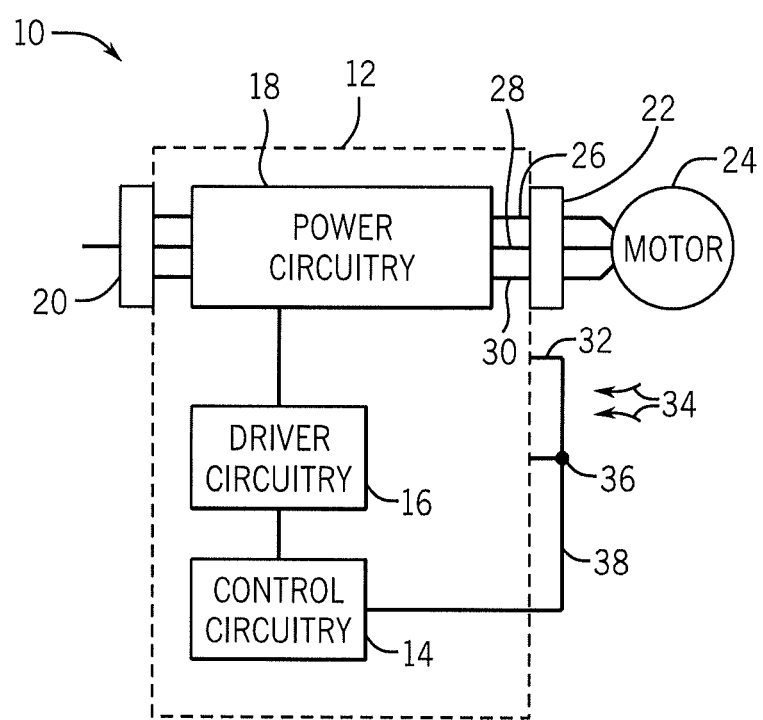
FIG. 1 is a schematic diagram of a motor drive with an inlet temperature sensor in accordance with an embodiment of the present disclosure.

Turning now to the drawings, FIG. 1 is a block diagram of a motor drive system 10 illustrating various internal components of a motor drive 12. For example, the motor drive 12 may include control circuitry 14, driver circuitry 16, and power circuitry 18. The power circuitry 18 may receive three-phase power 20 and output three phase power 22 to a motor 24. The power circuitry 18 may include, for example, power electronic switching circuitry. The control circuitry 14 and driver circuitry 16 may include a control circuit board and various optional function circuits. The driver circuitry 16 may signal switches of the power circuitry 18 to rapidly close and open, resulting in a three phase waveform output across output terminals 26, 28, and 30. The driver circuitry 16 is controlled by the control circuitry 14, which may operate autonomously, or which may respond to command inputs from a remote control monitor through a network. Similarly, operation of the driver circuitry 16 may be coordinated, via the control circuitry 14, with that of other drives. Many different control schemes and functions may be implemented by a processor of the control circuitry 14, and programs for such operation may be stored on the control board, such as for closed loop speed control, closed loop torque control, drive derating control, among many others.

The motor drive 12 may include a fan 32 to provide cooling to the circuitry (e.g., power circuitry 18) internal to the motor drive 12. The fan 32 may be configured to draw relatively cool ambient air into the motor drive 12, as shown by arrows 34, and to direct the air through a duct or wind tunnel that houses the various circuitry. As discussed in detail below, present embodiments may include a temperature sensor 36 disposed proximate an air inlet of the fan 32 and used to sense the temperature of the ambient air entering the air inlet. The temperature sensor 36 may provide ambient temperature feedback signals to the control circuitry 14, for example via a fan power/control cable 38 of the motor drive 12, or wirelessly. The control circuitry 14 may perform various calculations in substantially real time to determine diagnostics (e.g., drive derating requirements) and prognostics of the motor drive 12 based on the sensed inlet temperature. Such calculations may provide more accurate predictive prognostics to a user than would be available without the inlet temperature sensor 36. In addition, the control circuitry 14 may provide enhanced control of the motor drive 12 based on these calculations to increase the expected lifetime and operating efficiency of the motor drive 12.

Figure 2:
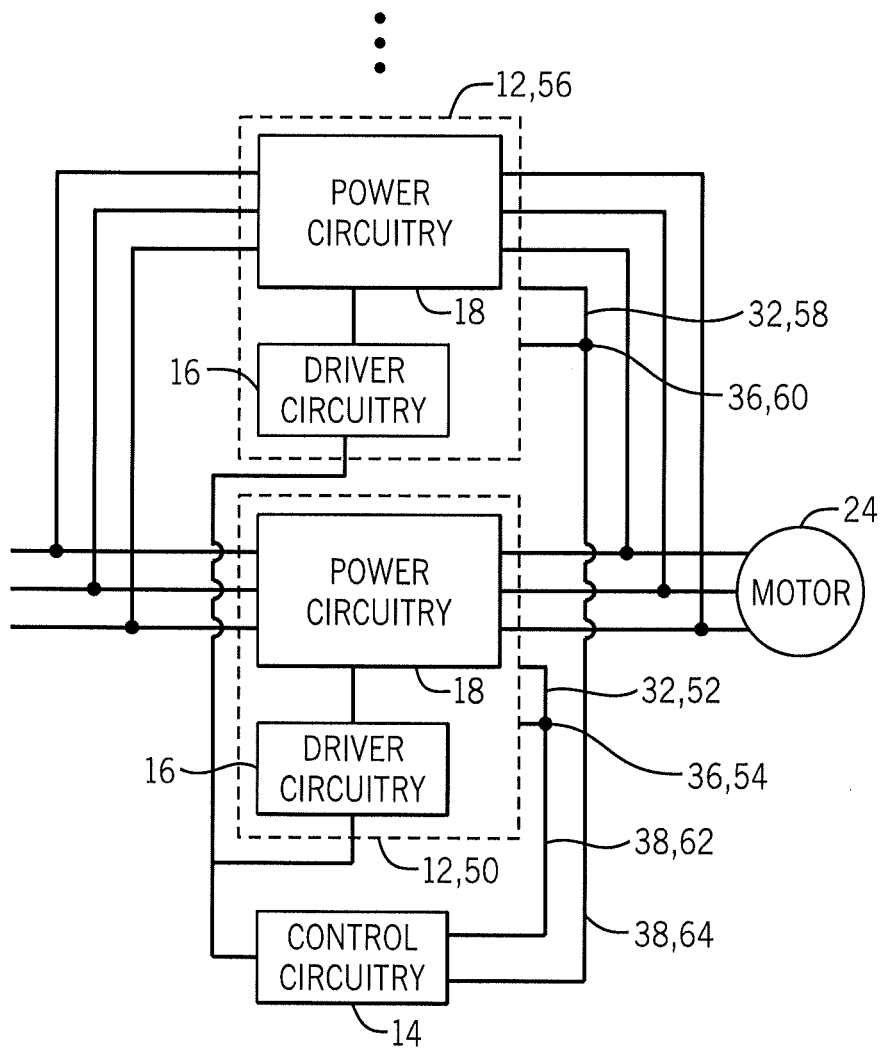
FIG. 2 is a schematic diagram of a motor drive system having multiple motor drive power modules to drive a single motor in accordance with an embodiment of the present disclosure.

The temperature sensor 36 may be located proximate a fan inlet in various other arrangements of the motor drive system 10. For example, inlet temperature sensing may be applied to a motor drive system 10 that uses multiple separate motor drives 12 to drive a single process. FIG. 2 is one such embodiment, having two or more motor drives or drive modules 12 operably coupled in parallel to drive the motor 24. In the illustrated embodiment, each of the motor drives 12 is equipped with the driver circuitry 16 and the power circuitry 18. However, the control circuitry 14 used to control the driver circuitry 16 for each of the motor drives 12 may be located remotely from the motor drives 12. Any number of motor drives 12 may be added to or removed from the motor drive system 10 to condition a desired amount of power output to the motor 24.

In such embodiments, each of the motor drives 12 may be equipped with the temperature sensor 36 disposed near an air inlet of the fan 32. For example, in the illustrated embodiment a first motor drive 50 includes a first fan 52 with a first temperature sensor 54. Similarly, a second motor drive 56 includes a second fan 58 with a second temperature sensor 60. Each of the temperature sensors 54 and 60 may be communicatively coupled to the control circuitry 14 via respective cables 62 and 64. In such embodiments, the control circuitry 14 may be configured to determine prognostics for each of the motor drives 50 and 56 based on the respective inlet air temperature measurements.

Calculations performed via the control circuitry 14 may be utilized to identify one or more of the motor drives 12 that are experiencing operational difficulties. For example, if internal defects or contaminants are reducing the amount of cooling taking place in the motor drive 12, the change in temperature between ambient temperature and internal temperature of one drive may be significantly less than the change in temperature of another drive connected in parallel. In response, the control circuitry 14 may output signals to provide a notification to a user that a particular motor drive 12 is not operating effectively. In other embodiments, two or more motor drives 12 may be coupled in parallel, as shown, each having its own control circuitry 14 with a processor for determining and/or implementing drive diagnostics or prognostics. In such cases, the control circuitry 14 of each of the motor drives 12 may be linked together via another control structure to control operation of the motor 24.

Figure 3:
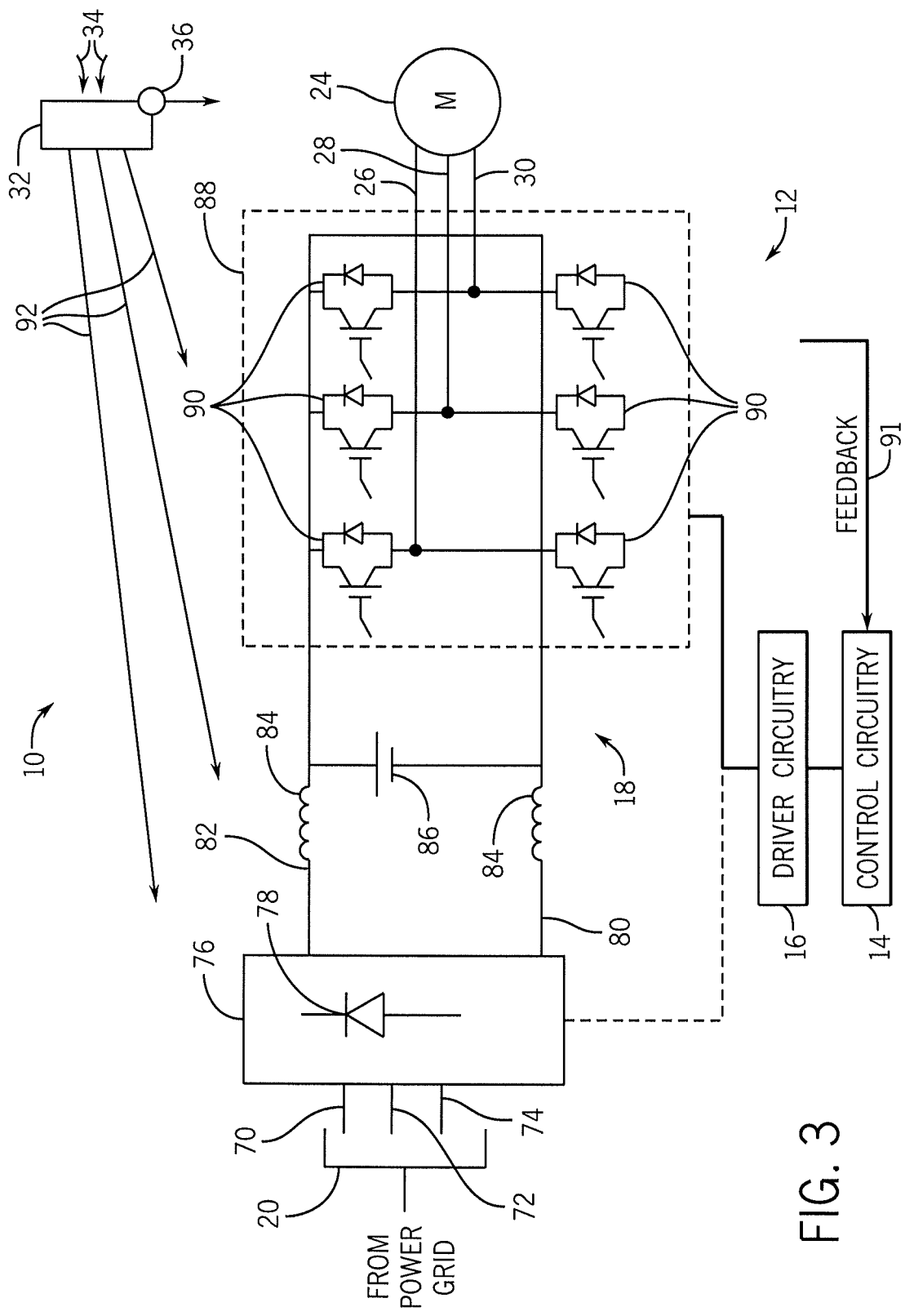
FIG. 3 is a schematic diagram of power electronic switching circuitry of the motor drive of FIG. 1 in accordance with an embodiment of the present disclosure.

FIG. 3 is a schematic diagram that details components of the power circuitry 18. In the illustrated embodiment, the power circuitry 18 includes power electronic switching circuitry. The power circuitry 18 may be located within a power conversion module of the motor drive 12. As mentioned above, the power circuitry 18 typically receives the three phase power 20 as an input, such as from the power grid. The three phase power source is electrically coupled to a set of input terminals 70, 72, and 74 that provide three phase AC power of constant frequency to rectifier circuitry 76. The rectifier circuitry 76 includes components, such as diodes 78 that perform full wave rectification of the three phase voltage waveform. After rectification, all phases of the incoming power are combined to provide DC power to a low side 80 and to the high side 82 of a DC bus. Inductors 84 may be coupled to both the high and low sides of the DC bus and act as chokes for smoothing the rectified DC voltage waveform. One or more filter capacitors 86 may link the high side 82 and the low side 80 of the DC bus and are also configured to smooth the rectified DC voltage waveform. Together, the inductors 84 and the capacitors 86 serve to remove most of the ripple from the waveform, so that the DC bus carries a waveform closely approximating a true DC voltage. It should be noted that the three-phase implementation described herein is not intended to be limiting, and the invention may be employed on single-phase circuitry, as well as on circuitry designed for applications other than motor drives.

An inverter 88 is coupled to the DC bus and generates a three phase output waveform at a desired frequency for driving the motor 24 connected to the output terminals 26, 28, and 30. Within the illustrated inverter 88, two insulated gate bipolar transistors (IGBT's) 90 are coupled in series for each phase. The pair of transistors 90 may be coupled from collector to emitter, between the high side 82 and low side 80 of the DC bus. Three of these transistor pairs are then coupled in parallel to the DC bus, for a total of six transistors 90. Each of the output terminals 26, 28, and 30 is coupled to one of the outputs between one of the pairs of transistors 90. The driver circuitry 16 signals the transistors 90 to rapidly close and open, resulting in a three phase waveform output across output terminals 26, 28, and 30. The driver circuitry 16 is controlled by the control circuitry 14, based on various inputs. Such inputs may include, for example, operator inputs received from an operator interface. In addition, the control circuitry 14 may receive feedback 91 representative of a current operational state of the motor drive 12. Such feedback 91 may include sensor feedback from one or more sensors (e.g., temperature sensor 36) disposed throughout the motor drive system 10.

In some embodiments, the motor drive 12 may be a regenerative motor drive configured to operate in a regenerative phase of operation at times and in the driving operation described above at other times. In the regenerative phase of operation, the rectifier circuitry 76 may allow for inertial energy or braking energy of the three-phase motor 24 to be redirected back into the supply mains (e.g., power grid) of the three phase power 20. As will be appreciated by those skilled in the art, during regenerative operation, the motor 24 behaves as a three-phase generator. Consequently, switches in the rectifier circuitry 76 may be switched by the driver circuitry 16 in such a way as to allow the alternating current flowing through the DC bus to pass back into the supply network, thereby recapturing inertial energy of the motor 24.

As noted above, the motor drive 12 may be equipped with the fan 32 for cooling the power circuitry 18 throughout drive operation. As illustrated, the fan 32 may be positioned in the motor drive 12 such that air drawn through an air inlet of the fan 32 (e.g., arrows 34) is directed over the power circuitry 18 of the motor drive 12. The air may provide cooling to the power electronic switching components, which may otherwise overheat due to the rapid opening and closing of the transistors 90. Arrows 92 represent the air flowing over each of the rectifier circuitry 76, the high side 82 and low side 80 of the DC bus, and the inverter 88. The power circuitry 18 may all reside on a single circuit board that is disposed in a housing of the motor drive 12, and the fan may direct the cooling air over the circuit board. In some embodiments, the air may flow over the driver circuitry 16 and/or the control circuitry 14 as well, depending on whether these components are located in the motor drive 12 and depending on the spatial arrangement of the components relative to the fan 32.

As noted above, the temperature sensor 36 located near an air inlet of the fan 32 may provide inlet temperature feedback for control of the motor drive 12 and for determining relatively accurate prognostics and diagnostics of the motor drive 12. FIGS. 1-3 represent embodiments of motor drive systems 10 that may utilize an inlet temperature measurement to determine reliability calculations, remaining life estimations, drive health evaluation, component health evaluation (e.g., the fan 32), derating requirements, and other information for promoting efficient operation of one or more motor drives 12. These embodiments are meant to be illustrative and not limiting, so that a temperature sensor 36 may be disposed near the fan 32 of any other type of motor drive system 10 as well.

Figure 4:
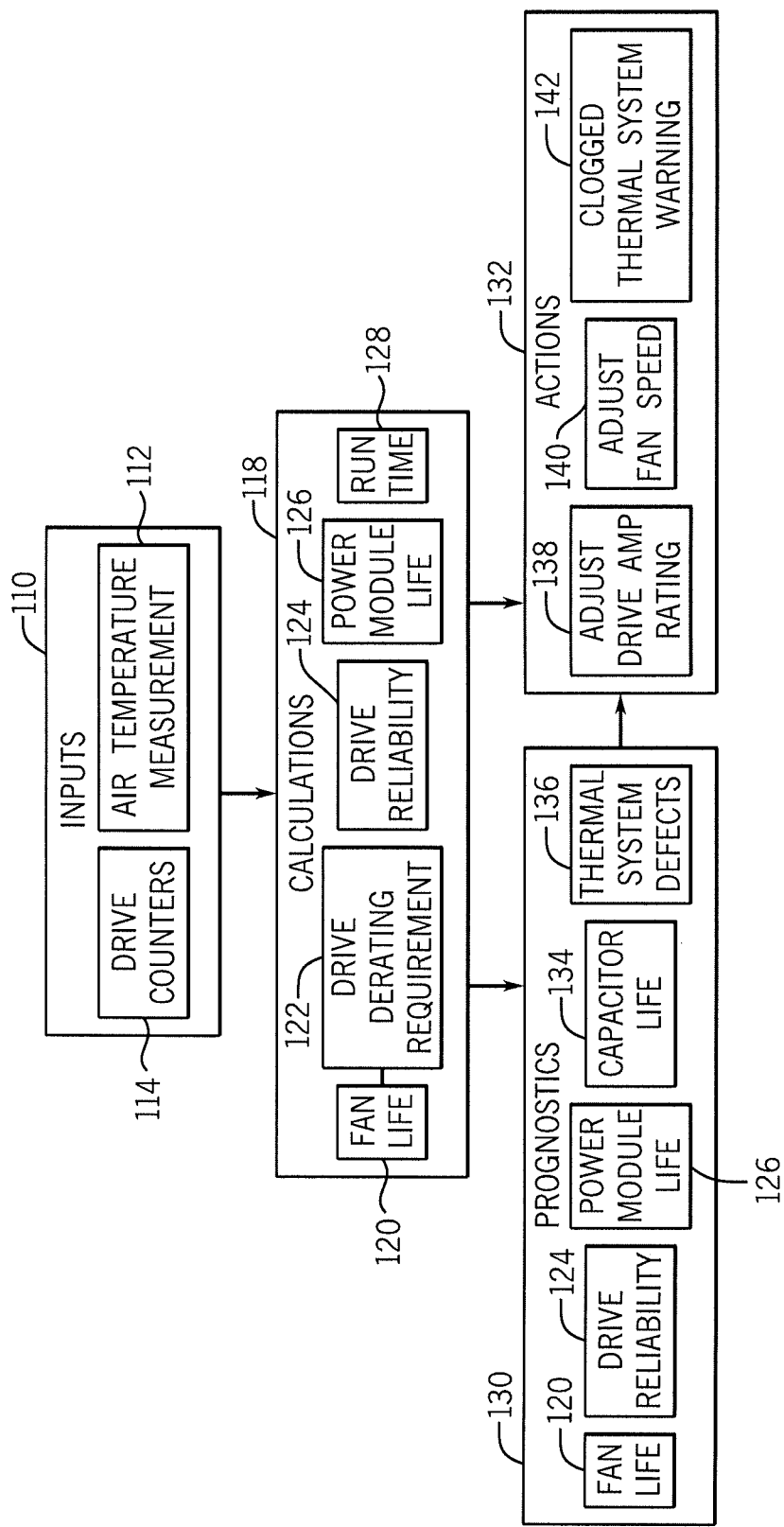
FIG. 4 is a block diagram illustrating various functions performed by control circuitry of a motor drive equipped with an inlet temperature sensor in accordance with an embodiment of the present disclosure.

Having now described several types of motor drive systems 10 that may utilize the disclosed inlet temperature sensor, a more detailed description of the uses of the sensed temperature will be provided. To that end, FIG. 4 is a block diagram providing several functions that may be performed by a processor of the motor drive 12, the processor being communicatively coupled to the temperature sensor 36 in accordance with the disclosed techniques. The processor may include any desirable processing system used to carry out the calculations described herein. For example, the processor may include a microprocessor located in the control circuitry 14 of the motor drive system 10. The control circuitry 14 may provide control signals to the driver circuitry 16 for executing various actions determined based on the processor's calculations.

Inputs 110 to the processor may include, among other things, an air temperature measurement 112 and any number of various drive counters 114. The air temperature measurement 112 may include a signal indicative of air temperature sent from the temperature sensor 36 to the processor at different times throughout operation of the motor drive 12. In some embodiments, the temperature sensor 36 may provide such signals to the processor at a predetermined interval, especially when the temperature measurement 112 is used as feedback 91 for control functions of the control circuitry 14. In other embodiments, the temperature sensor 36 may provide the air temperature measurement 112 to the processor at desired times based upon receipt of a signal from the processor. This may be the case when the temperature measurement 112 is used for determining prognostics and providing the prognostics to an operator upon request.

In addition to the temperature measurement 112, the processor may receive signal inputs corresponding to the drive counters 114 present in the motor drive 12. These drive counters 114 may include any additional parameter that is determined or counted at a regular interval to provide feedback 91 for controlling the motor drive 12. For example, the drive counters 114 may include a fan run time, a fan speed, and a module temperature. The fan run time represents how long the fan 32 has been operating, and the fan speed represents the substantially instantaneous speed of the fan 32. The module temperature may represent a temperature of one or more components internal to the motor drive 12, as determined via embedded temperature sensors. For example, one or more temperature sensors may continuously monitor temperatures of the transistors 90 in the power circuitry 18. This may allow the processor to determine a change in temperature between the ambient air (e.g., sensed via temperature sensor 36) and the power circuitry 18 (e.g., sensed via embedded temperature sensors). Other drive counters 114 may be provided as inputs 110 to the processor as well.

The processor may utilize the inputs 110 to perform any number of desired calculations 118. Such calculations 118 may be performed at any point of time during operation of the motor drive 12, so that they are substantially near real-time calculations. Based on the calculations 118, the processor may determine at least one of a drive prognostic or a drive diagnostic during operation of the motor drive 12. The calculations 118 may be performed as code executed via the processor, the code being stored in a memory or other non-transitory computer-readable medium coupled to the processor. The processor may calculate several different parameters or diagnostics related to drive operation, and some non-limiting examples are provided in the illustrated embodiment. These calculated parameters may include, for example, a fan life 120, a drive derating requirement 122, a drive reliability 124, a power module life 126, and a run time 128.

The fan life 120 may be an expected lifetime or remaining lifetime of the fan 32, as determined based on fan speed, fan run time, and the air temperature measurement 112. The drive derating requirement 122 may be calculated based on the air temperature measurement 112, since the derating requirement for a particular motor drive 12 is generally related to the ambient temperature at which the motor drive 12 is operated. Specifically, when the motor drive 12 runs at a higher ambient temperature, the maximum allowed power output of the motor drive 12 should be lower so that internal drive components (e.g., power circuitry 18) do not overheat. Similarly, the motor drive 12 may operate at higher amperages when run in an environment with a relatively lower ambient temperature. By adjusting (e.g., uprating or derating) the amperage of the motor drive 12 according to the ambient temperature, it may be possible to improve an overall lifetime of the motor drive 12.

The drive reliability 124 may be a measure of the ability of the motor drive 12 to perform its designated function (e.g., output power at a desired rating) for a certain period of time. This drive reliability 124 may be expressed in terms of a probability of the motor drive 12 failing, and may be determined based at least in part on the air temperature measurement 112. The power module life 126 may be an expected lifetime or remaining lifetime of the power conversion module (e.g., power circuitry 18) of the motor drive 12, as determined based on a change in temperature across the power module components. The run time 128 may be an amount of time the motor drive 12 has been operating, as determined by a drive counter 114 in the control circuitry 14, the driver circuitry 16, or the power circuitry 18. The run time 128 may be useful for determining prognostics related to the efficiency or the remaining lifetime of the motor drive 12.

Some of the calculations 118 performed by the processor may be used to provide relatively accurate prognostics 130 for the motor drive 12, while others may be used to generate control signals for performing various actions 132 via the control circuitry 14. The prognostics 130 may include any predictive information related to drive performance, including the fan life 120, the drive reliability 124, the power module life 126, a capacitor life 134, and thermal system defects 136. The capacitor life 134 may be an expected total lifetime or remaining lifetime of the one or more capacitors 86 in the power circuitry 18, and may be determined based on the air temperature measurement 112. The processor may signal an operator interface to indicate the capacitor life 134 to the user or to provide a warning when the capacitor 86 is almost in need of replacement. The thermal system defects 136 may be determined based on an efficiency of a cooling system of the motor drive 12, or how much heat the cooling system removes from internal components of the motor drive 12 at a certain inlet air temperature. Based in part on the air temperature measurement 112, the processor may determine whether defects or degradation are present within the cooling system. Such defects may include, for example, dust accumulation on a heat sink of the power circuitry 18, air not flowing through the motor drive 12 at a high enough flow rate, improper installation of thermal system components, a clogged filter, and so forth. An operator may perform maintenance on the motor drive 12 when such thermal defects are identified by the motor drive system 10 to increase an operating efficiency of the motor drive 12.

The processor may be configured to determine any number of the above-listed prognostics 130, among others, related to operation of the motor drive 12. Again, the prognostics 130 may depend on the temperature of the environment in which the motor drive 12 is operated. Thus, an accurate measurement of the ambient temperature may be desirable for accurately determining the prognostics 130. A relatively more accurate measurement of the ambient temperature may be obtained via the temperature sensor 36 placed at the fan inlet, as opposed to sensors embedded within the motor drive circuitry.

In addition to providing prognostics 130 throughout operation of the motor drive 12, the processor may provide outputs to components (e.g., control circuitry 14) of the motor drive 12 for performing various actions 132. These actions 132 may include controlling operations of the motor drive 12 or providing information (e.g., prognostics 130 or warnings) to an operator.

In the illustrated embodiment, the actions 132 include adjusting (block 138) a drive amp rating so that the motor drive 12 operates within the calculated drive derating requirement 122. This adjustment may involve derating the amperage output of the motor drive 12 when the air temperature measurement 112 is relatively high. Similarly, when the air temperature measurement 112 is relatively low the rating adjustment may involve uprating the amperage output of the motor drive 12. This may ensure that the power circuitry 18 operates relatively efficiently (e.g., higher estimated power module life 126) while still operating within the derating requirement 122. That is, a processor of the control circuitry 14 adjusts a performance of the motor drive 12 based on the determined drive derating requirement 122.

Adjusting (block 140) a fan speed of the fan 32 is another action 132 that may be performed based on the calculations 118 and/or the prognostics 130 determined by the processor. In some embodiments, the fan speed may be reduced when the air temperature measurement 112 is lower, in order to extend the fan life 120 and/or the power module life 126. In other embodiments, the fan speed may be reduced to maintain a desired overall efficiency of the motor drive 12. As noted previously, the processor may provide outputs to an operator interface for warning a user of potential inefficiencies or a request for maintenance. As an example, the actions 132 prompted by the processor may include providing a clogged thermal system warning 142 based on the identified thermal system defects 136 within the motor drive 12.

Figure 5:
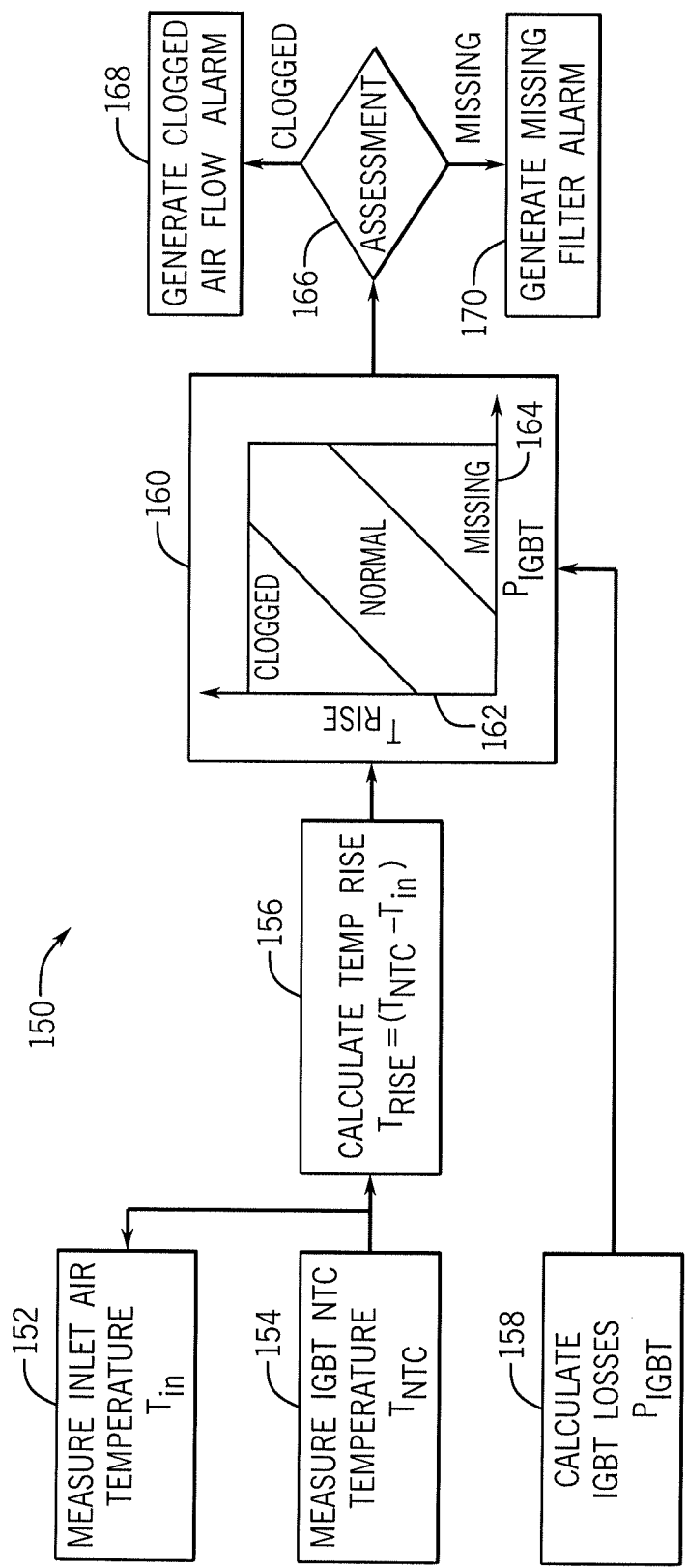
FIG. 5 is a process flow diagram illustrating a method for determining thermal system defects in accordance with an embodiment of the present disclosure.
Figure 6:
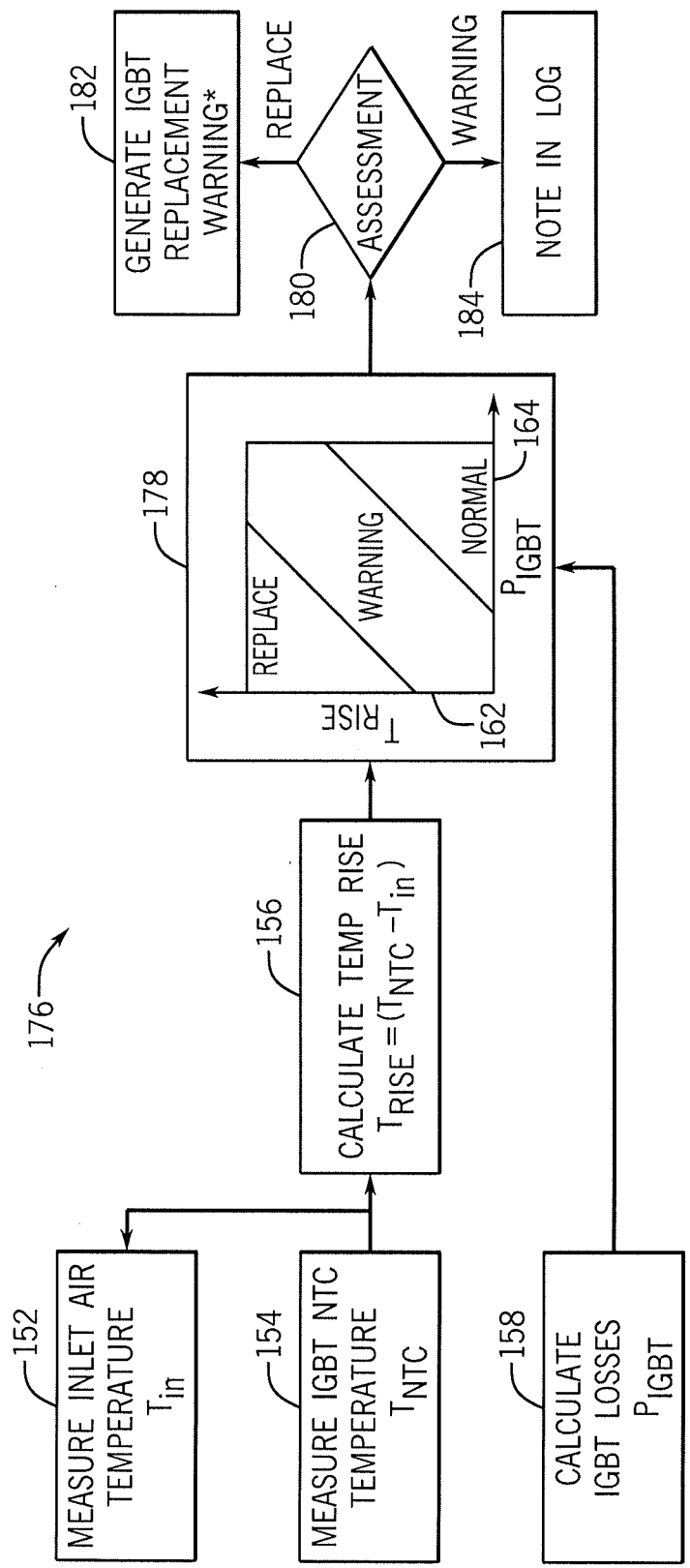
FIG. 6 is a process flow diagram illustrating a method for determining power module life in accordance with an embodiment of the present disclosure.
Figure 7:
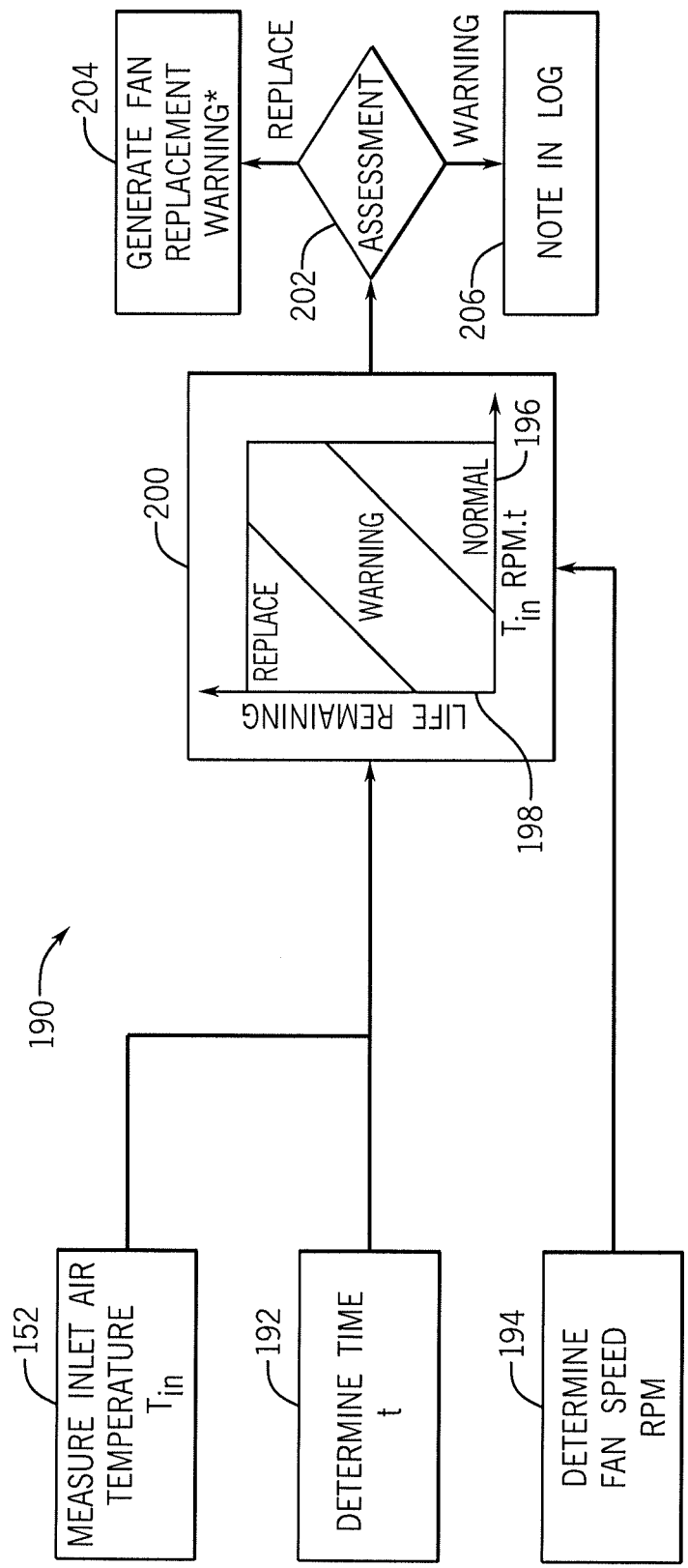
FIG. 7 is a process flow diagram illustrating a method for determining fan life in accordance with an embodiment of the present disclosure.

FIGS. 5-7 detail some examples of the calculations 118, determined prognostics 130, and actions 132 performed by the control circuitry 14 as outlined in FIG. 4. Specifically, FIG. 5 is a process flow diagram of a method 150 for determining the thermal system defects 136 and performing certain actions 132 based on the determination. The method 150 includes measuring (block 152) the inlet air temperature $T_{in}$. This is the air temperature measurement 112 determined by the temperature sensor 36 near the air inlet. In addition, the method 150 includes measuring (block 154) an IGBT negative temperature coefficient (NTC) temperature $T_{NTC}$. This is a temperature of one or more of the transistors 90 in the power circuitry 18 of the motor drive 12, and may be measured using a temperature sensor embedded in the power circuitry 18. The temperature sensor may be a NTC sensor or any other desirable sensor. Using these monitored temperatures as inputs, the control circuitry 14 may calculate (block 156) a temperature rise $T_{rise}$. This value may represent a change in temperature of the air between the inlet of the fan 32 and the power circuitry 18, calculated according to the following expression:

$$T_{rise}=T_{NTC}-T_{in} \qquad (1)$$

In addition to determining $T_{rise}$, the method 150 may include calculating (block 158) IGBT losses $P_{IGBT}$. These calculated losses represent power lost across the power circuitry 18 through heat generated by the rapidly switching transistors 90. The calculation to determine the losses may be based on the controlled operation (e.g., switching speed) of the power circuitry 18. The control circuitry 14 may determine this operation, and the expected losses associated therewith. In addition, the control circuitry 14 may determine whether thermal system defects 136 exist based on a relationship 160 between the calculated $T_{rise}$ 162 and the calculated $P_{IGBT}$ 164. The relationship 160 between $T_{rise}$ 162 and $P_{IGBT}$ 164 may indicate that the motor drive 12 has particular thermal system defects 136 (e.g., clogged or missing) or that the motor drive 12 is operating as desired (e.g., normal).

The control circuitry 14 may perform an assessment 166 based on the relationship 160 to determine a current operational state of the thermal system of the motor drive 12. The control circuitry 14 may determine, for example, that a thermal system component of the motor drive 12 is clogged. The "clogged" determination may be made when the $T_{rise}$ is higher than expected for the $P_{IGBT}$ of the power circuitry 18. This may indicate that the cooling air and/or heat sink of the motor drive 12 are not providing the expected cooling to the internal components of the motor drive 12, and thus may be clogged. In response to this determination, the control circuitry 14 may generate (block 168) a clogged air flow alarm. This alarm may correspond to the clogged thermal system warning 142 of FIG. 4. This alarm may indicate to an operator that an air filter or heat sink of the motor drive 12 is clogged, the fan 32 is degraded, or the air flow through the motor drive 12 is otherwise obstructed.

The control circuitry 14 may determine via the assessment 166 that a thermal system component of the motor drive 12 is missing. The "missing" determination may be made when the $T_{rise}$ is lower than expected for the $P_{IGBT}$ of the power circuitry 18. This may indicate that cooling air is flowing through the motor drive 12 at a higher flow rate than necessary to cool the power circuitry 18. In response to this determination, the control circuitry 14 may generate (block 170) a missing filter alarm to indicate to an operator that an air filter is missing from the motor drive 12, or that a wrong type of fan 32 is in use.

FIG. 6 is a process flow diagram of a method 176 for determining the power module life 126 of the motor drive 12 based in part on the air temperature measurement 112. Similar to the method 150 of FIG. 5, this method 176 may compare the calculated $T_{rise}$ and the calculated $P_{IGBT}$. In the method 176, a different relationship 178 between the $T_{rise}$ and the $P_{IGBT}$ may be used to determine whether the transistors 90 are operating normally, nearing the point of needing replacement, or in need replacement. This relationship 178 may be related to the power module life 126 discussed with reference to FIG. 4.

The control circuitry 14 may perform an assessment 180 based on the relationship 178 to determine a current operational state of the power circuitry 18. For example, the control circuitry 14 may determine that one or more of the transistors 90 need to be replaced when, according to the relationship 178, the $P_{IGBT}$ is lower than expected for the heat output by the power circuitry 18 (e.g., based on $T_{rise}$). In response to this determination, the control circuitry 14 may provide signals to generate (block 182) an IGBT replacement warning. This warning may include, for example, a visualization or text string on a display, or an alarm, of an operator interface in communication with the control circuitry 14. The text may read, for example, "IGBTs are nearing the end of their useful life. Replace soon." Based on signals received from the control circuitry 14, the operator interface may indicate to an operator that the power module (e.g., circuit board) that holds the IGBTs should be replaced. If the assessment 180 indicates that one or more of the IGBTs are nearing the end of their life ("warning"), the warning may be noted (block 184) in a log that is integral with or separate from the control circuitry 14. The control circuitry 14 may access the log, utilizing this and other information stored in the log to improve the determined prognostics 130.

FIG. 7 is a process flow diagram of a method 190 for determining the fan life 120 of the fan 32 based in part on the air temperature measurement 112, and implementing various actions in response to the determined fan life 120. As with the previously described methods 150 and 176, the method 190 includes measuring (block 152) $T_{in}$. In addition, the method 190 includes determining (block 192) a run time t of the motor drive 12, for example using a specific drive counter 114 of the motor drive 12. The method 190 also includes determining (block 194) a fan speed (e.g., in RPMs) of the fan 32 using another of the drive counters 114 in the motor drive 12. The air temperature measurement 112, the run time, and the fan speed all may be provided as inputs 196 to determine a remaining fan life 198 based on a specific relationship 200 of the inputs 196. That is, the remaining fan life 198 is a function of each of the inputs 196.

The control circuitry 14 may perform an assessment 202 of the remaining fan life 198 at regular intervals and implement certain actions in response to the assessment 202. For example, the control circuitry 14 may determine that the fan 32 should be replaced. This may be the case when the fan speed decreases significantly, compared to what the fan speed should be when the motor drive 12 is operating at a certain ambient temperature, and the run time of the motor 12 continues to increase as the power electronics are operating. When this determination is made, the control circuitry 14 may generate (block 204) a fan replacement warning, which may be a visualization, or a visible or audible message to an operator. For example, the warning message may include "Fan is nearing the end of useful life. Replace soon." In response to the assessment 202 yielding a relatively low remaining fan life 198, the control circuitry 14 may note (block 206) a warning in a log. As noted above, the control circuitry 14 may control operation of multiple motor drives 12 operating in parallel. The fan replacement warning may be specific to the fan 32 of a particular motor drive 12, so that the operator knows which motor drive 12 has a fan 32 that needs replacing. Similarly, the control circuitry 14 may perform the warnings or actions in response to the other assessments 166 and 180 for a particular one of multiple connected motor drives 12.

Figure 8:
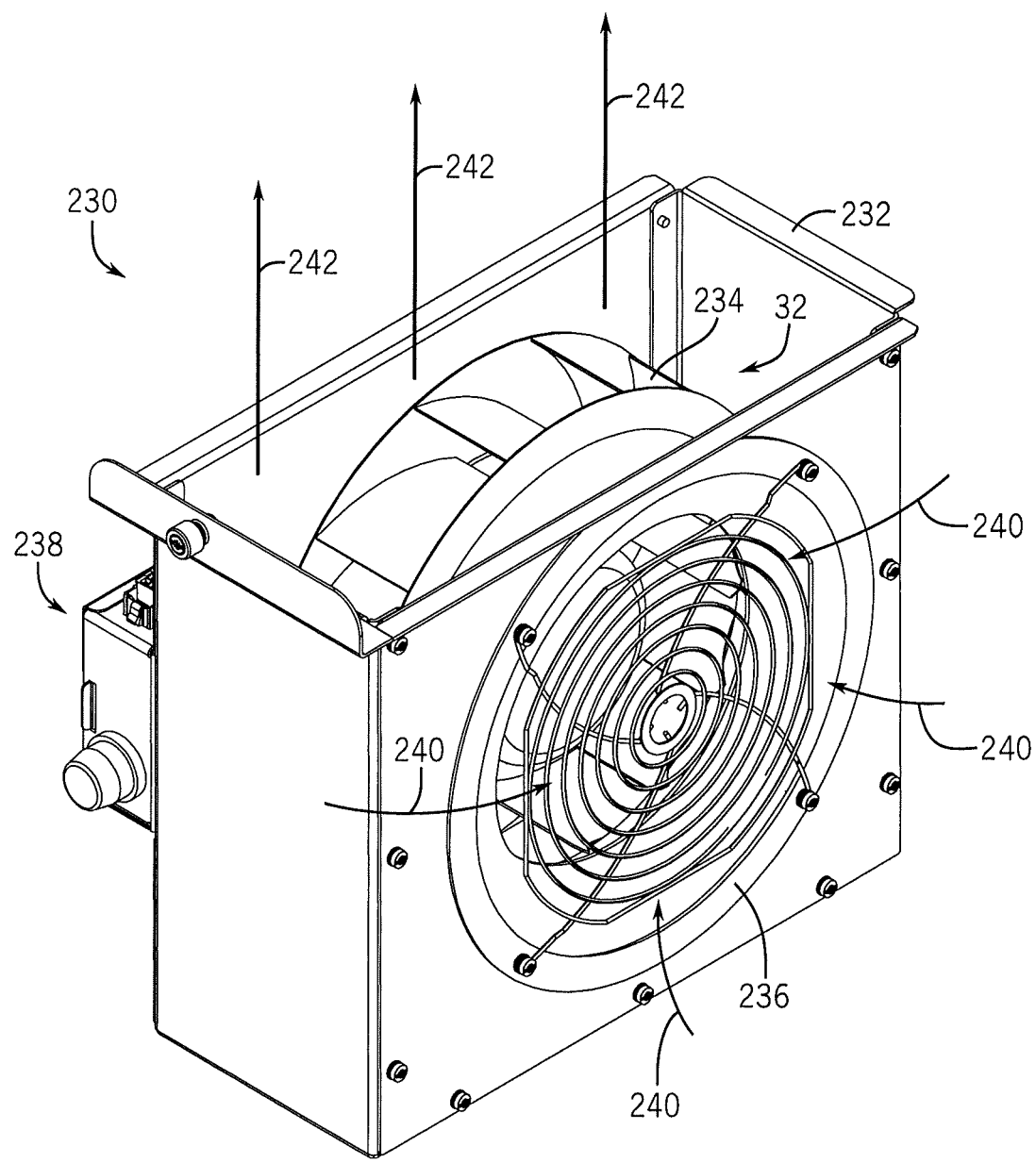
FIG. 8 is a perspective view of a fan assembly of the motor drive of FIG. 1 in accordance with an embodiment of the present disclosure.

Having now described several examples of calculations, prognostics, and actions that may be performed based on an ambient air temperature, FIGS. 8-11 provide a more detailed description of the physical arrangement of the temperature sensor 36 that senses this temperature. Specifically, FIG. 8 is a perspective view of a fan assembly 230 having the fan 32 of the motor drive 12. The fan assembly 230 may be separate from other internal components of the motor drive 12, as shown, or the fan 32 may be incorporated directly into a wall of a housing that surrounds the motor drive circuitry. In the illustrated embodiment, the fan assembly 230 includes a fan housing 232 that encloses the fan 32, an impeller 234 of the fan 32 disposed in the fan housing 232, a fan motor (not shown), an air inlet 236, and a cable assembly 238. The fan motor turns the impeller 234 at a desired fan speed based on signals from the control circuitry 14. The fan 32 draws air in through the air inlet 236, as shown by arrows 240. In the illustrated embodiment, the impeller 234 is designed so that the fan 32 pushes the air upward through the motor drive 12, as shown by arrows 242. Other arrangements of the fan assembly 230 may be possible as well.

Figure 9:
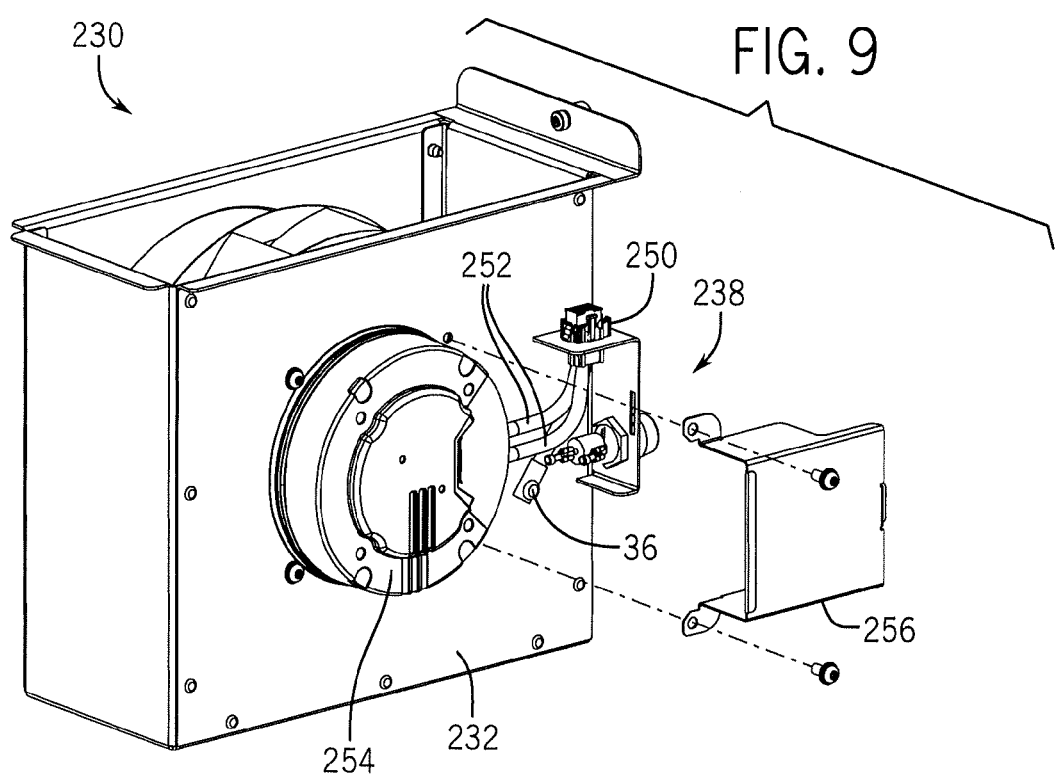
FIG. 9 is an exploded perspective view of the fan assembly of FIG. 8 in accordance with an embodiment of the present disclosure.

FIG. 9 is an exploded perspective view of the fan assembly 230, showing the temperature sensor 36 disposed near the air inlet 236. In the illustrated arrangement, the temperature sensor 36 is located adjacent a back side of the fan housing 232, so that it is not in a direct path of the airflow through the motor drive 12. It may be desirable to position the temperature sensor 36 away from direct airflow so that the temperature measurement is not affected by changes in fan speed.

In the illustrated embodiment, the temperature sensor 36 is located within the cable assembly 238, and the temperature sensor 36 may make use of a cable connector 250 of the cable assembly 238. The cable connector 250 routes wires 252 between a fan motor 254 of the fan assembly 230 and circuitry of the motor drive 12. Control and feedback signals (e.g., indicative of fan speed) may flow between the control circuitry 14 and the fan motor 254 via the wires 252. In addition, one of the wires 252 may route power (e.g., 240 V) to the fan motor 254 from power conversion circuitry of the motor drive 12. Along with the communication and power routed to the fan motor 254, one of the wires 252 may carry a signal indicative of the ambient temperature from the temperature sensor 36 to the control circuitry 14. Each of the wires 252 may be routed through the power/communication cable 38 from the fan assembly 230 to the control circuitry 14, as described above with reference to FIGS. 1 and 2. In this way, the temperature sensor 36 may be incorporated into already existing structures of the fan assembly 230 of the motor drive 12.

The temperature sensor 36, along with the wires 252, may be enclosed by a cover box 256, which protects the temperature sensor 36 from contamination by dirt and other foreign objects. In an embodiment, the temperature sensor 36 may be a negative temperature coefficient (NTC) sensor, although other types of temperature sensors could be used in other embodiments. As illustrated, the temperature sensor 36 may be mounted or fastened to the fan housing 232. The fan housing 232 may be sheet metal or some other material with a high thermal conductivity so that the temperature of the fan housing 232 is approximately consistent with the ambient air temperature. The mass of the fan housing 232 may act as a dampening filter of the temperature, so that the temperature sensor 36 provides a stable signal to the control circuitry 14. In other embodiments, however, the temperature sensor 36 may be positioned in open air to detect the ambient air temperature.

The illustrated location of the temperature sensor 36 may yield a relatively robust and dependable air temperature reading. In other embodiments, the temperature sensor 36 may be incorporated in different ways with the fan assembly 230. For example, the temperature sensor 36 may be mounted inside the fan housing 232. This may be particularly useful if the fan motor 254 and the wires 252 are located within the fan housing 232. Still further, the temperature sensor 36 may be mounted along an inlet air duct of the motor drive 12, such as a duct located just downstream (e.g., in a direction of the arrows 242 of FIG. 8) of the fan 32. Again, other arrangements of the temperature sensor 36 located proximate an air inlet of the fan 32 may be utilized to directly sense an ambient temperature of the motor drive 12.

Figure 10:
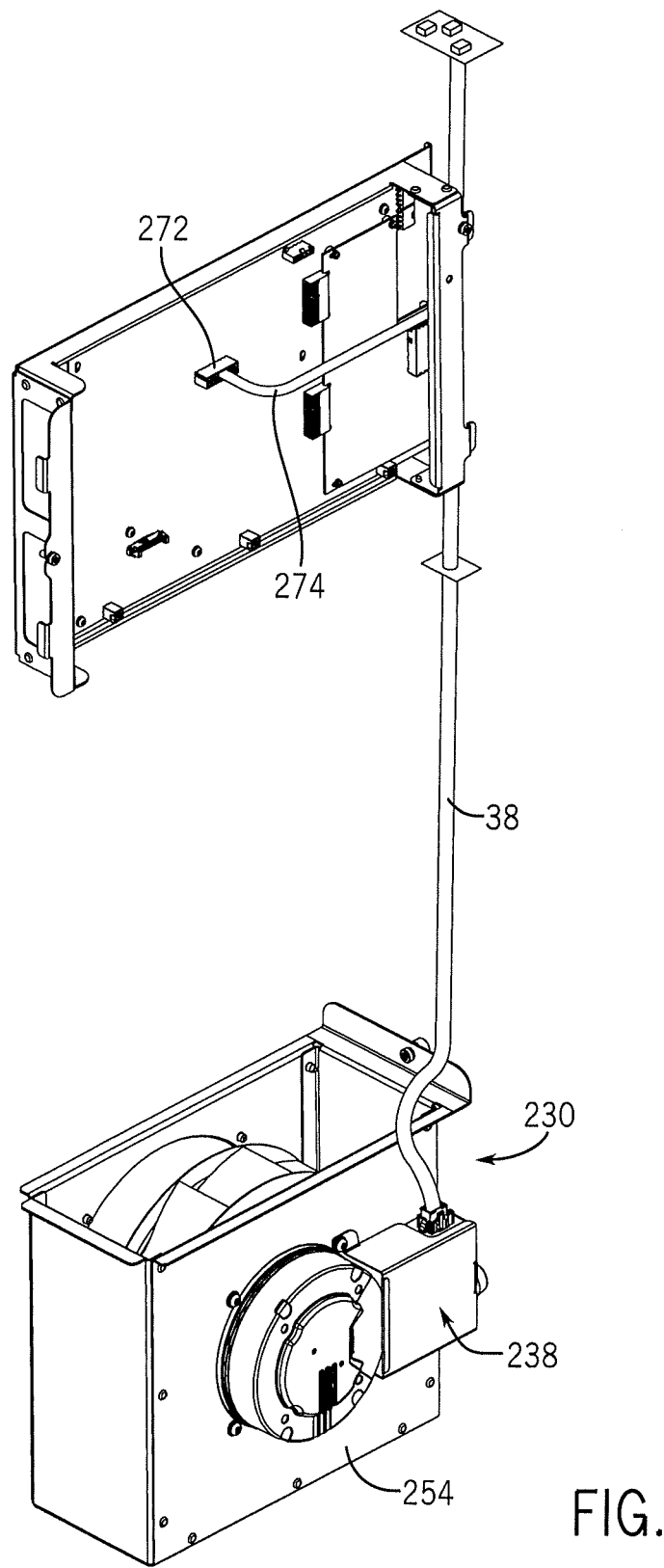
FIG. 10 is a perspective view of certain components of a motor drive having the fan assembly of FIGS. 8 and 9 in accordance with an embodiment of the present disclosure.

FIG. 10 is a perspective view of components of the motor drive 12 having the fan assembly 230 of FIGS. 8 and 9. As noted above, the fan motor 254 may receive control and power from circuitry of the motor drive 12 via the power/control cable 38, and the same power/control cable 38 may provide the feedback temperature signals from the temperature sensor 36 to the control circuitry 14. In other embodiments, the temperature sensor 36 may be configured to provide the feedback temperature signals to the control circuitry 14 wirelessly. That is, the temperature sensor 36 may be communicatively coupled to a processor of the control circuitry via a wireless connection. In the illustrated embodiment, a power interface circuit board 272 is coupled to the power/control cable 38 (via a wire connection 274). The power interface circuit board 272 may provide the power needed to operate the fan 32 and communicate with the fan motor 254 in response to control signals from the control circuitry 14. The control circuitry 14, again, may be located in the motor drive 12 or outside of the motor drive 12. In some embodiments, the power interface circuit board 272 may form a part of the control circuitry 14.

Figure 11:
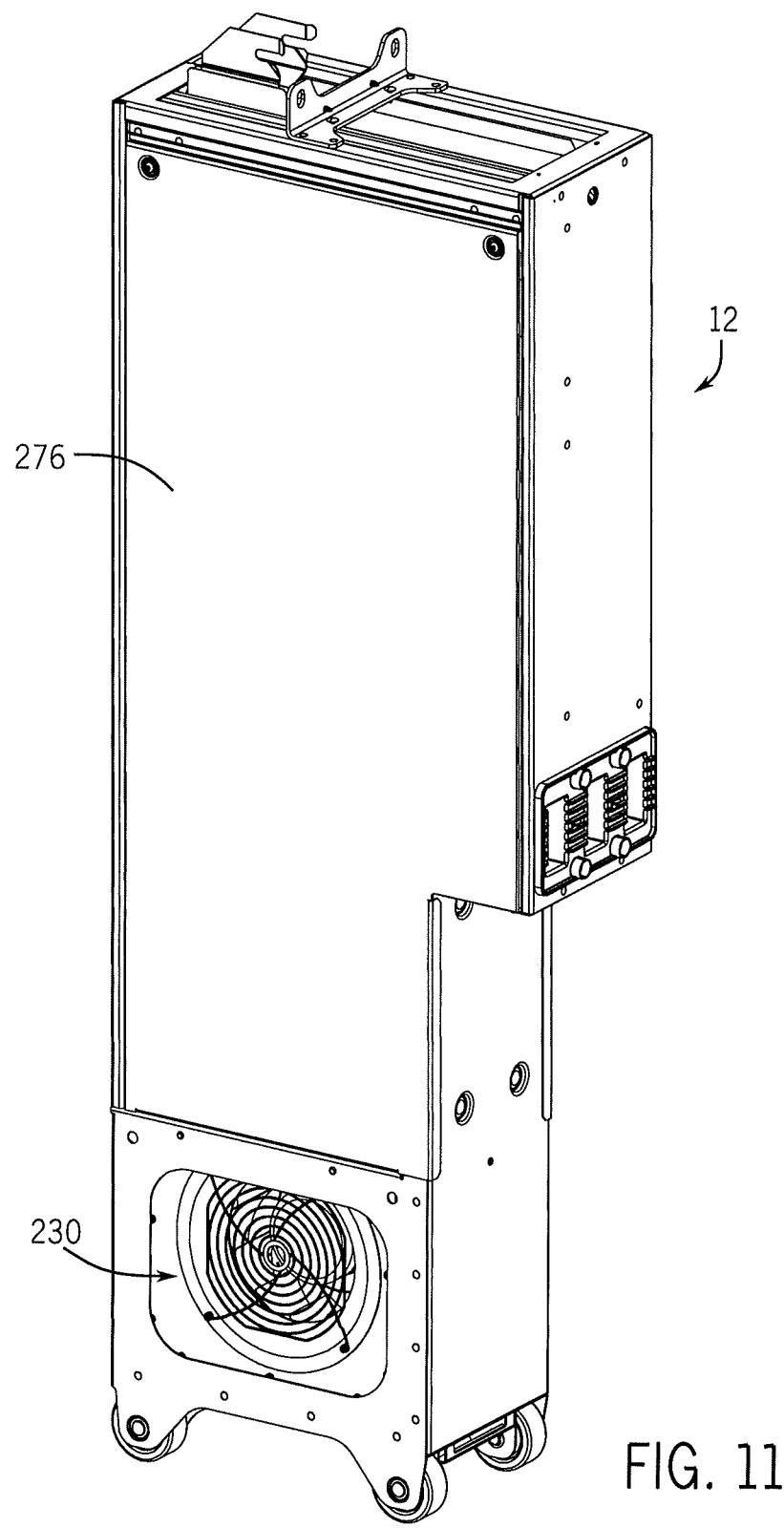
FIG. 11 is a perspective view of the motor drive having the fan assembly of FIGS. 8 and 9 in accordance with an embodiment of the present disclosure.

As shown in FIG. 11, all (or nearly all) of the components of the motor drive 12 may be enclosed in a drive housing 276. The fan assembly 230 may be located at the bottom of the motor drive 12, drawing air into and up through the motor drive 12 to cool the internal components (e.g., power circuitry 18). By sensing the temperature near the air inlet of the fan 32, it may be possible to determine a more accurate ambient temperature of the motor drive 12 than would be possible by estimating the ambient temperature from feedback of sensors embedded in the circuitry of the motor drive 12. The relatively low cost temperature sensor 36 may leverage the hardware architecture already present in the motor drive 12 to enable relatively accurate prognostics and advanced drive control. This advanced control may allow the motor drive 12 to inform the customer of drive reliability and life during operation of the motor drive 12, increase an amount of product uptime, and ultimately extend the life of the motor drive 12.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electric motor drive system, comprising:
   a fan configured to cool power electronic components of the electric motor drive system;
   a temperature sensor disposed proximate an air inlet of the fan and configured to sense an ambient temperature of air entering the air inlet; and
   a processor communicatively coupled to the temperature sensor and configured to determine at least one of a drive prognostic and a drive diagnostic based on the sensed ambient temperature.

2. The electric motor drive system of claim 1, wherein the processor is configured to determine at least one of the drive prognostic or the drive diagnostic during operation of the electric motor drive system.

3. The electric motor drive system of claim 1, wherein at least one of the drive prognostic or the drive diagnostic comprises an expected lifetime of the fan.

4. The electric motor drive system of claim 1, wherein at least one of the drive prognostic or the drive diagnostic comprises a reliability of the electric motor drive system.

5. The electric motor drive system of claim 1, wherein at least one of the drive prognostic or the drive diagnostic comprises an expected lifetime of a power conversion module.

6. The electric motor drive system of claim 1, wherein at least one of the drive prognostic or the drive diagnostic comprises an expected lifetime of a capacitor of the electric motor drive system.

7. The electric motor drive system of claim 1, wherein at least one of the drive prognostic or the drive diagnostic comprises a thermal system defect of the electric motor drive system.

8. The electric motor drive system of claim 1, wherein the drive diagnostic comprises a derating requirement of the electric motor drive system.

9. The electric motor drive system of claim 8, wherein the processor is configured to output a control signal to adjust a performance of the electric motor drive system based on the determined derating requirement.

10. The electric motor drive system of claim 1, wherein the processor is configured to output a control signal to adjust a speed of the fan based on the determined prognostic.

11. The electric motor drive system of claim 1, wherein the processor is configured to output a control signal to provide a warning indication to an operator based on the determined prognostic.

12. The electric motor drive system of claim 1, wherein the temperature sensor is disposed in an inlet air duct of the electric motor drive system.

13. The electric motor drive system of claim 1, wherein the temperature sensor is disposed adjacent a fan housing of the electric motor drive system.

14. The drive system of claim 1, comprising control circuitry communicatively coupled to the temperature sensor via a cable configured to route power and/or control signals between the control circuitry and the fan.

15. The drive system of claim 1, comprising control circuitry communicatively coupled to the temperature sensor via a wireless connection.

16. The electric motor drive system of claim 1, wherein the processor is communicatively coupled to two or more temperature sensors disposed proximate air inlets of two or more respective motor drives, and wherein the processor is configured to determine at least one of a drive prognostic or a drive diagnostic for each of the motor drives.

17. An electric motor drive system, comprising:
a first fan configured to cool power electronic components of a first motor drive;
a first temperature sensor disposed proximate a first air inlet of the first fan and configured to sense a first ambient temperature of air entering the first air inlet;
a second fan configured to cool power electronic components of a second motor drive;
a second temperature sensor disposed proximate a second air inlet of the second fan and configured to sense a second ambient temperature of air entering the second air inlet; and
one or more processors communicatively coupled to the first and second temperature sensors and configured to determine at least one of a drive prognostic and a drive diagnostic for each of the first and second motor drives based on the first and second sensed ambient temperatures.

18. The electric motor drive system of claim 17, comprising a single processor configured to determine the at least one of the drive prognostic or the drive diagnostic during operation of the first and second motor drives in parallel to drive a single process.

19. The electric motor drive system of claim 17, comprising a first processor configured to determine the at least one of the drive prognostic or the drive diagnostic for the first motor drive and a second processor configured to determine the at least one of the drive prognostic or the drive diagnostic for the second motor drive, during operation of the first and second motor drives in parallel to drive a single process.

20. A method, comprising:
sensing an ambient air temperature via a temperature sensor disposed proximate an air inlet of a fan of an electric motor drive, wherein the fan is configured to cool power electronic components of the electric motor drive via air drawn through the air inlet; and
determining, via a processor communicatively coupled to the temperature sensor, at least one of a drive prognostic and a drive diagnostic based on the sensed ambient temperature.

21. The method of claim 20, comprising adjusting a performance of the drive device based on the determined drive diagnostic.

22. The method of claim 20, comprising generating an alarm based on the determined drive prognostic.

23. The method of claim 20, comprising sensing a power module temperature via a temperature sensor disposed proximate the power electronic components, calculating a temperature difference between the sensed ambient air temperature and the sensed power module temperature, and determining the drive prognostic based on the calculated temperature difference.

* * * * *